United States Patent [19]

Jones

[11] Patent Number: 5,010,126

[45] Date of Patent: Apr. 23, 1991

[54] PROCESS FOR PRODUCING A PETROLEUM WAX COMPOSITION

[75] Inventor: Richard L. Jones, Ponca City, Okla.

[73] Assignee: Conoco Inc., Ponca City, Okla.

[21] Appl. No.: 543,608

[22] Filed: Jun. 25, 1990

Related U.S. Application Data

[62] Division of Ser. No. 278,911, Nov. 30, 1988, Pat. No. 4,965,305.

[51] Int. Cl.$^5$ ............................................. C08L 91/08
[52] U.S. Cl. ................... 524/349; 162/168.1; 524/487; 524/489; 524/474
[58] Field of Search ............... 524/349, 350, 487, 489, 524/474, 481; 162/68.1

[56] References Cited

U.S. PATENT DOCUMENTS

| | | | |
|---|---|---|---|
| 2,999,828 | 9/1961 | Davenbrink et al. | 524/489 |
| 3,025,167 | 3/1962 | Butler | 106/270 |
| 3,192,062 | 6/1965 | Ababian et al. | 524/487 |
| 3,272,690 | 9/1966 | Shadan | 162/169 |
| 3,326,835 | 6/1967 | Signorelli et al. | 524/488 |
| 3,362,839 | 1/1968 | Wendel | 524/224 |
| 3,440,194 | 4/1969 | Taranto et al. | 524/340 |
| 4,234,204 | 9/1980 | Nichols et al. | 524/471 |
| 4,613,632 | 9/1986 | Aliani et al. | 524/474 |

*Primary Examiner*—Allan M. Lieberman
*Attorney, Agent, or Firm*—Cleveland R. Williams

[57] ABSTRACT

A hot melt wax composition and process for producing said hot melt wax composition are disclosed. The wax compositions are suitable for coating fibrous materials, for example, paper and corrugated paper boards. The coating compositions comprise a blend of a recrystallized heavy intermediate wax, a polymeric hydrocarbon compound, a tackifier resin and a phenolic anti-oxidant.

10 Claims, No Drawings

PROCESS FOR PRODUCING A PETROLEUM WAX COMPOSITION

This is a division of application Ser. No. 07/278,911 filed Nov. 30, 1988, now U.S. Pat. No. 4,965,305.

BACKGROUND OF THE INVENTION

1. Field Of The Invention

The present invention relates to improved wax compositions and fibrous substrates coated therewith, and more particularly to compositions of recrystallized heavy intermediate petroleum wax and polymeric hydrocarbon compounds. In addition, the wax compositions contain a tackifier resin and a phenolic anti-oxidant. These wax compositions are particularly suitable for coating fibrous substrates. The copending application of Richard L. Jones entitled "Fibrous Substrates Containing Hot Melt Coating Made From A Novel Petroleum Wax", Serial No. 07/278,700, Filed Nov. 30, 1988, describes fibrous substrates and a process for coating said substrates using the wax compositions disclosed herein, the disclosure of which is incorporated herein by reference.

It is known to coat fibrous substrates, for example, paper and the like with wax and wax like compositions. These coatings are particularly useful in preventing the migration of moisture either out or into a container treated therewith. Numerous waxes have been used as coatings for fibrous substrates in the past, including animal and vegetable waxes, for example, bees wax, wool wax, cotton wax and the like.

The mineral waxes, in particular, the petroleum waxes such as paraffin wax, microcrystalline waxes and the like are more commonly used at the present time to coat fibrous substrates. Blends of these waxes have additionally been used in the past. These wax coatings generally exhibit one or more deficiencies, such as, lack of sufficient hardness, scuff resistance, tensile strength, resistance to cracking, an opaque color and other undesirable characteristics. In the absence of microcrystalline waxes, distillate waxes are usually too brittle to be effective as coating waxes, particularly at ambient temperatures such as room temperature and below. To overcome these and other difficulties it has become common practice to use blends of certain additives in wax compositions. The use of polymers as additives in waxes has greatly improved certain characteristics in wax coatings, however, many wax coatings which use these additives still suffer from one or more disadvantages such as an opaque color, poor resistance to moisture, as well as insufficient heat and thermal stability, grease resistance and gloss stability. The wax compositions herein overcome these difficulties and, in addition, when applied as a coating to fibrous substrates are clear in color. This is important because it allows for writing and marks on the fibrous substrate to be visible to the eye after the coating is applied.

2. Description Of The Prior Art

Wax compositions, paper products containing coating of wax compositions and processes for making and producing the same are known and are currently practiced commercially.

For example, U. S. Pat. 2,999,828, issued Sept. 12, 1961, relates to wax compositions and sheet materials coated therewith. In particular, the patent discloses compositions of petroleum wax and polyethylene as a coating for sheet materials. The petroleum waxes used are of an intermediate class midway in molecular weight between paraffin wax and microcrystalline wax.

U.S. Pat. 3,025,167, issued Mar. 13, 1962, discloses a thermoplastic composition suitable for use as a coating on a flexible base sheet, such as paper. The thermoplastic composition consists of a petroleum wax having a melting point between 130° F. and 170° F. and an ethylene/vinyl acetate copolymer.

U.S. Pat. 3,192,062, issued June 29, 1965, relates to wax compositions and sheet materials coated therewith. The wax composition consists of a modified heavy distillate wax and a polyethylene compound or copolymers of ethylene with higher monoolefins or polypropylenes.

U.S. Pat. 3,272,690, issued Sept. 13, 1966, relates to a method of improving the wet strength of paper. The method involves blending a wax/ethylene vinyl acetate copolymer with paper pulp to impart an improved wet strength to fibrous materials. The wax employed in the blend is a paraffin crystalline wax.

U.S. Pat. 3,326,835, issued June 20, 1967, discloses petroleum wax compositions which are described as suitable for use in forming protective coatings for wrapping paper and paper board. The petroleum wax compositions consist of intermediate and microcrystalline waxes which have been upgraded by adding therewith a polybutene-1 resin.

U.S. Pat. 3,362,839, issued Jan. 9, 1968, relates to wax-containing compositions which are described as suitable for coating paper, cardboard, cartons and the like. The wax-containing compositions consist of blends of paraffin wax and microcrystalline wax and ester selected from vinyl acetate or ethyl acrylate and an N-substituted alkyl amide.

U.S. Pat. 3,440,194, issued April 22, 1969, discloses coating compositions consisting of petroleum wax, an interpolymer selected from the group of ethylene and vinyl acetate or ethylene and ethyl acrylate, or graft copolymers of polyethylene and dicarboxylic acid or anhydride thereof.

It must be noted, however, that the wax compositions comprising a recrystallized heavy intermediate wax and a polymeric hydrocarbon compound and/or in combination with a tackifier resin and phenolic anti-oxidant claimed herein are new and unappreciated by the prior art.

SUMMARY OF THE INVENTION

This invention encompasses new wax compositions that are particularly suitable for use as coating compositions for fibrous substrates. In particular, the invention relates to a wax composition which comprises (a) from about 50 weight percent to about 90 weight percent of a recrystallized heavy intermediate petroleum wax having a melting point of from about 155° F. to about 170° F. and a clear color; and (b) from about 10 weight percent to about 30 weight percent of a polymeric hydrocarbon compound having a molecular weight of from about 2,000 to about 100,000 and a melt index of from about 1 to about 250° at 375° F. In addition, the wax compositions contain from about 0.01 weight percent to about 15 weight percent of a hydrocarbon resin derived from a $C_5$ olefin petroleum feed stock or terpene resin, and from about 0.01 weight percent to about 0.2 weight percent of a petroleum-wax soluble, phenolic anti-oxidant.

DETAILED DESCRIPTION OF THE INVENTION

The present invention relates to wax compositions, which comprise a recrystallized heavy intermediate petroleum wax, a polymeric hydrocarbon compound and optionally and preferably a hydrocarbon resin derived from a $C_5$ olefin petroleum feed stock or terpene resin and a phenolic anti-oxidant. These wax compositions are particularly suitable for use as wax coatings for fibrous substrates.

The heavy intermediate waxes of the present invention are derived commercially from petroleum stocks. The petroleum industry generally classifies petroleum waxes in three main categories, namely (1) paraffins, (2) intermediate, and (3) microcrystallines. Other classes of waxes include the scale waxes and slack waxes. This invention is concerned with a novel and upgraded heavy intermediate wax which exhibits excellent color and coating qualities when formulated to coat fibrous substrates.

Generally, in a commercial petroleum process the paraffin waxes comprise the 90, 200 and 350 distillate fractions from a vacuum distillation unit. These numbers represent Saybolt universal seconds, a measure of the distillate viscosity at 100° F. This wax is a mixture of solid hydrocarbons derived from the overhead wax distillate fraction obtained from the fractional distillation of petroleum. The paraffin wax, after purification, is a substantially colorless, brittle and low viscosity material normally having a melting point of from about 120° F. to about 160° F.

Microcrystalline waxes are conveniently produced from the nondistillable vacuum tower residues from the fractional distillation of petroleum. These waxes differ from paraffin waxes in having branched hydrocarbons of higher molecular weight. They are considered more plastic than paraffin waxes, normally are dark colored or opaque, and usually have a melting point of from about 150° F. to about 200° F. Generally, most wax coating compositions in the past have preferably used a mixture of paraffin wax and microcrystalline wax in combination with one or more polymeric compound and the like to obtain desirable properties.

The waxes of the current invention, e.g., heavy intermediate or HI waxes are produced from the 650 distillate wax fraction of a vacuum distillation unit, e.g., Saybolt universal seconds at 100° F. The temperature and pressure of the vacuum residue are optionally adjusted to distill off the 650 distillate wax fraction in the process herein. It should be noted that petroleum crude oils from different sources will have different optimum temperatures for distilling off the 650 distillate wax fraction. These HI waxes have a melting point range of from about 145° F. to about 185° F., preferably from about 155° F. to about 170° F., and exhibit somewhat different physical properties than the individual paraffin waxes and microcrystalline waxes and, in addition, do not have to be blended with other waxes to form desirable coating waxes.

After the vacuum distillation step, the heavy intermediate wax is conveniently dewaxed using a conventional dewaxing process, for example, a furfural or duosol solvent extraction process which are well known in the petroleum industry.

Next, the dewaxed heavy intermediate crude wax is dissolved and crystallized from a two solvent system, for example, a methyl ethyl ketone/toluene mixed solvent. The mixed solvent is normally mixed in a weight ratio of from about 70:30 to about 45:55 of methyl ethyl ketone to toluene respectively. The mixed solvent normally will be heated to a temperature above the congealing point of the heavy intermediate wax which is approximately 158° F. Preferably, the mixed solvent is heated to a temperature of from about 170° F. to about 250° F. It should be noted that higher temperatures can be used, but are not deemed necessary. The heavy intermediate wax is contacted with an excess of the mixed solvent, preferably at a weight ratio of from about 1:1 to about 1 to 6 of heavy intermediate wax to mixed solvent. The resulting mixture is then cooled to a temperature which allows the heavy intermediate wax to crystallize from the mixed solvent system. Normally a temperature of from about 80° F. to about 180° F. will be sufficient to crystallize the wax.

After the heavy intermediate wax is recovered, it is redissolved and recrystallized from the above-described two solvent system using substantially the same procedure, including temperatures and weight ratios of solvent and/or wax.

Finally, the recrystallized heavy intermediate wax is perculated in the molten state through a clay bed utilizing a gravity flow system. In order to maintain the wax in the molten state, a temperature range of from about 200° F. to about 300° F. is used for the wax and the clay bed. Normally, the clay bed and wax are contacted on a 1:1 weight ratio, especially from about 5 weight percent to about 60 weight percent of wax per weight percent of clay. Suitable clays include bauxite, fullers earth and silica gel, especially bauxite.

The wax compositions herein comprise (a) from about 50 weight percent to about 90 weight percent of a recrystallized heavy intermediate petroleum wax and from about 10 weight percent to about 30 weight percent of a polymaric hydrocarbon having a molecular weight of from about 2,000 to about 100,000 and a melt index of from about 1 to about 250° at 375° F. The polymeric compound suitable for use herein is a member selected from the group consisting of ethylene-vinyl acetate copolymer, ethylene-ethyl acrylate copolymer and polypropylene and mixtures thereof. The preferred polymeric compound is ethylene-vinyl acetate copolymer.

The copolymers of ethylene-vinyl acetate herein are characterized by a 15 weight percent to about 30 weight percent functional vinyl acetate content. Particularly preferred ethylene-vinyl acetate copolymers suitable for use are the copolymers manufactured and sold commercially by the E. I. DuPont de Nemours and Company under the trade name Elvax resins. The Elvax resins having grades of from 220 to 460 are especially preferred for use as the polymeric hydrocarbon compound.

The ethylene-ethyl acrylate copolymers herein are characterized by a 20 weight percent to about 30 weight percent functional ethyl acrylate content. Typical of these compounds are the ethylene-ethyl acrylate copolymers marketed commercially by the Dow Chemical Company under the trade name EA 2018 and EA 3018.

The polypropylene polymers of this invention are normally solid polymers preferably having an average molecular weight of from about 1,000 to about 20,000. Typically, polypropylene has a melt point between 280° F. and 335° F., and a specific gravity between about 0.90 and 0.92.

The wax compositions of this invention can also contain (c) from about 0.01 weight percent to about 15 weight percent preferably from about 0.01 weight percent to about 10 weight percent of a hydrocarbon resin derived from a $C_5$ olefin petroleum feed stock or polyterpene resin and (d) from about 0.01 weight percent to about 0.2 weight percent, preferably from about 0.01 weight percent to about 0.1 weight percent of a petroleum-wax soluble, phenolic anti-oxidant.

The hydrocarbon resins derived from a $C_5$ olefin petroleum feed stock or polyterpene resins herein are tackifying agents which improve the adhesion and flexibility of the wax compositions. Suitable hydrocarbon resins derived from a $C_5$ olefin petroleum feed stock are marketed commercially by the Exxon Chemical Company under the trade name Escorez tackifying resins. A particularly preferred tackifier for use herein is Escorez 1504.

Other hydrocarbon resins suitable for use include the polyterpene resins. The polyterpene resins which are suitable for use are those having melting points of from about 215° F. to about 275° F. These resins are conveniently produced by catalytically polymerizing pinenes. Suitable polyterpene resins produced by the polymerization of pinenes are sold commercially by the Arizona Chemical Company under the trade name Zonarez and by the Naville Chemical Company under the trade name Nevtac, especially Nevtac 100.

The final component in the wax compositions herein is a petroleum-wax soluble, phenolic anti-oxidant. The ditert-butyl paracresols are particularly suitable for use herein. The compounds provide protection against oxidation and increase the tensile strength of the wax compositions herein. A particularly suitable compound is 2,6,ditert-butyl paracresol marketed as Tenox BHT by the Eastman Chemical Company.

The wax compositions of the present invention are particularly suitable for use as coating material for fibrous substrates and the like. Fibrous substrates which are suitable for use as supports for the coating compositions include paper, paper board, paper cartons, paper cups, corrugated box board and the like.

The process of hot melt coating as employed in this invention includes any process in which the wax composition is heated or otherwise formed into a molten, viscous, mass and applied as a coating to a fibrous substrate or article and allowed to congeal on the substrate. Thus the wax composition can be sprayed on the fibrous substrate, applied to a roller which in turn applies the molten wax composition to a substrate, or alternatively the substrate can be dipped into the molten wax. The preferred process, however, is the curtain coating process in which a molten wax flows from a narrow, slit-like orifice and is permitted to fall vertically in the form of a molten, viscous curtain onto the surface of a fibrous substrate.

In conventional curtain coating apparatus now in use, such as the Ashdee curtain coating machine, the basic elements of the machine typically comprise a coating head from which a thin film of wax gravitates in the form of a curtain onto a moving conveyer belt containing a fibrous substrate to be coated. A receptacle or container to receive the coating wax is located below the coating head to receive excess wax from the coating step. In a typical operation of a typical coating machine, the coating wax is allowed to gravitite from the coating head, or is ejected therefrom under a slight pressure and falls through the air as a curtain or thin film of molten wax. The excess liquid wax composition is received by the container or receiver trough below the coating head and is recirculated from the receiving trough to the coating head after passing through suitable heating and degassing equipment. Normally the molten wax is heated to a temperature of from about 220° F. to about 320° F.

The following examples serve to demonstrate the best mode of how to practice the invention herein and should not be construed as a limitation thereof.

EXAMPLES I TO IV

Three different waxes were obtained from the Cit-Con Company's refinery in Lake Charles, Louisiana for testing and comparison. The Cit-Con Company is a joint venture between the Cit-Go Corporation and Conoco Inc., a subsidiary of the E. I. DuPont de Nemours and Company. The three waxes tested were paraffin 350 wax, microcrystalline wax and a recrystallized heavy intermediate 650 wax (HI wax).

The HI wax had the following properties:

TABLE 1

| HI Wax | |
| --- | --- |
| Oil Content, wt % | 1.0 |
| Congealing Point, °F. | 160.0 |
| Melting Point, °F. | 162.0 |
| Kinematic Viscosity, CST 212° F. | 7.3 |
| Needle Penetration, dmm, °F. | 17.0 |
| Refractive Index, 176° F. | 1.4385 |
| Molecular Weight, MW | 533 |
| Maxium Carbon Number | 37 |
| Normal Alkane Content, wt % | 73 |

The three waxes were tested for the properties listed in Table 2 below without the benefit of additives.

TABLE 2

| Test Conducted | Ex. I Paraffin 350 Wax M.P 151° F. | Ex. II Microcrystalline Wax M.P. 186° F. | Ex. III 50/50 mixture Of Paraffin 350 Wax And Microcrystalline Wax | Ex. IV HI Wax M.P. 162° F. |
| --- | --- | --- | --- | --- |
| Color, ASTM-D1500 | 0.0 | 4.5 | 2.5 | 0.5 |
| Viscosity, CST ASTM-D445, 210° F. | 4.5 | 16.4 | 9.1 | 7.3 |
| Dropping Pt, °F. | 151 | 186 | 170 | 162 |
| Needle Penetration, 1/10 mm ASTM-D1321, 77° F. | 13 | 17 | 13 | 17 |
| Heat of Fusion BTU/Lb, by Diff. Scanning Color ASTM-D4419 | 91 | 72 | 82 | 83 |
| Boiling Pt., °F. ASTM-D1160 at 5 Liquid Vol. Dist. | 809 | 971 | — | 873 |
| Total Normal Alkane Content, Wt by Gas Chromatography | 90 | 54 | — | 73 |

As can readily be determined from the above there is a distinct difference between the various properties of the three waxes.

EXAMPLES V AND IX

Physical performance tests were conducted on blends of the three waxes from Examples I to IV and polymer additives to determine the properties of the wax compositions. The wax compositions, tests that were conducted and results are set forth in Table 3 below:

TABLE 3

| | Ex. V | Ex. VI | Ex. VII | Ex. VIII | Ex. IX |
|---|---|---|---|---|---|
| Composition, Wt % | | | | | |
| Paraffin 350 Wax M.P. 151° F. | 79.0 | 0.0 | 39.5 | 0.0 | 0.0 |
| Microcrystalline Wax, M.P. 186° F. | 0.0 | 79.0 | 39.5 | 0.0 | 0.0 |
| HI Wax M.P. 162° F. | 0.0 | 0.0 | 0.0 | 79.0 | 78.5 |
| EVA Copolymer[1] | 16.0 | 16.0 | 16.0 | 16.0 | 16.5 |
| Petroleum Hydrocarbon Resin[2] | 5.0 | 5.0 | 5.0 | 5.0 | 5.0 |
| BHT[3] | 0.00 | 0.00 | 0.00 | 0.00 | 0.05 |
| Property Tested | | | | | |
| Color, ASTM-D1500 | 0.5 | 3.0 | 2.0 | <1.0 | 0.5 |
| Viscosity, CP ASTM-D2669 | 306 | 667 | 456 | 427 | 491 |
| Needle Penetration 1/10 mm, ASTM-D1321, 77° F. | 7 | 12 | 7 | 9 | 8 |
| Dropping Point, °F. ASTM-D3461 | 157 | 191 | 175 | 166 | 172 |
| Tensile Strength lbs/sq in. ASTM-D638, 77° F. | 450 | 275 | 450 | 352 | 483 |
| Ductility, % Elongation ASTM-D638, 77° F. | 11 | 24 | 36 | 25 | 39 |

[1]EVA Copolymer - ethylene vinyl acetate copolymer with a 28 weight vinyl acetate content, a 6.0 melt index and a 212° F. soft point.
[2]Petroleum Hydrocarbon Resin - Escorex 1054, a tackifying resin marketed by the Exxon Chemical Company.
[3]BHT - 2,6,ditert-butyl paracresol.

The above data prove that the HI wax blends have superior tensile strength and ductility, % elongation when compared to the individual paraffin wax blends, microcrystalline wax blends and a 50/50 mixture of paraffin - microcrystalline wax blends. The color of the HI wax blend is superior to the other wax blends with the exception of the paraffin wax blend, however, the paraffin wax blend is very hard and brittle which is a disadvantage, e.g., see the tensile strength and ductility, % elongation data.

EXAMPLE X

The HI wax blend of Example IX was fed to the coating head of an Ashdee curtain coating machine, manufactured by George Koch and Sons of Evansville, Indiana, at a melt temperature of 240° F. A corrugated box board was moved under and through a falling curtain of the molten HI wax blend and the wax coating was allowed to congeal on the surface of the corrugated box board. The congealed coating was clear, not tacky and in addition, had excellent tensile strength and ductility.

As can be determined from the above example, the HI wax compositions herein have excellent color characteristics, tensile strength and ductility when compared with similar paraffin wax blends and/or crystalline wax blends. Additionally, the HI wax blends herein are superior coating compositions for fibrous substrates.

Obviously, many modifications and variations of the invention, as hereinbefore set forth, may be made without departing from the spirit and scope thereof, and therefore only such limitations should be imposed as are indicated in the apended claims.

I claim:
1. A process for producing a wax composition which comprises:
   (a) vacuum distilling a petroleum feed to prepare a 650 distillate heavy intermediate petroleum wax, having a melting point range of from about 155° F. to about 185° F.,
   (b) subjecting the heavy intermediate petroleum wax from step (a) to furfural/duosol solvent extraction,
   (c) dissolving and crystallizing the heavy intermediate petroleum wax from step (b) from a methyl ethyl ketone/toluene mixed solvent,
   (d) dissolving and recrystallizing the heavy intermediate petroleum wax from step (c) from a methyl ethyl ketone/toluene mixed solvent,
   (e) percolating the recrystallized heavy intermediate petroleum wax from step (d) in the molten state through a clay bed; and
   (f) blending the recrystallized heavy intermediate petroleum wax from step (e) at from about 50 weight percent to about 90 weight percent with from about 10 weight percent to about 30 weight percent of a polymeric compound selected from the group consisting of ethylene-vinyl acetate copolymer, ethylene-ethyl acrylate copolymer, polypropylene and mixtures there of and having a molecular weight of from about 2,000 to about 100,000 and a melt index of from about 1 to about 250° at 375° F.

2. The process according to claim 1 including adding from about 0.01 weight percent to about 15 weight percent of a hydrocarbon resin derived from a $C_5$ olefin petroleum feed stock or terpene resin to the blend of step (f).

3. The process according to claim 1 including adding from about 0.01 weight percent to about 0.1 weight percent of a petroleum-wax soluble, phenolic anti-oxidant to the blend of step (f).

4. The process according to claim 1 wherein the recrystallized heavy intermediate petroleum wax from step (d) has a melting point range of from about 155° F. to about 170° F..

5. The process according to claim 1 wherein the ethylene-vinyl acetate copolymer has a 15 weight percent to about 30 weight percent functional vinyl acetate content.

6. The process according to claim 1 wherein the ethylene-ethyl acrylate copolymer has a 20 weight percent to about 30 weight percent functional ethyl acrylate content.

7. The process according to claim 2 wherein the resin derived from a $C_5$ olefin petroleum feed stock or terpene resin has a softening point of from about 180° F. to about 250° F.

8. The process according to claim 3 wherein the petroleum-wax soluble, phenolic anti-oxidant is ditertbutyl paracresol.

9. The process according to claim 8 wherein the petroleum-wax soluble, phenolic anti-oxidant is 2,6,ditert-butyl paracresol.

10. The process according to claim 1 wherein the clay in the clay bed in step (e) is a member selected from the group consisting of bauxite, fullers earth and silica gel and mixtures thereof.

* * * * *